United States Patent [19]

Shibatani et al.

[11] 4,253,552
[45] Mar. 3, 1981

[54] ANTI-RUST COVER FOR A DISC ROTOR OF A VEHICLE DISC BRAKE

[75] Inventors: Juichi Shibatani; Kenichi Nakamura; Wataru Izuhara; Yuichiro Obu, all of Toyota, Japan

[73] Assignee: Toyota Jidosha Kogyo Kabushiki Kaisha, Aichi, Japan

[21] Appl. No.: 51,752

[22] Filed: Jun. 25, 1979

[30] Foreign Application Priority Data

Dec. 26, 1978 [JP] Japan ............................ 53-178685[U]
Mar. 7, 1979 [JP] Japan .............................. 54-28965[U]

[51] Int. Cl.³ .............................................. F16D 65/00
[52] U.S. Cl. .................................. 188/218 A; 188/2 R
[58] Field of Search ...................... 188/1 R, 2 R, 18 A, 188/218 A, 264 AA, 264 G

[56] References Cited

U.S. PATENT DOCUMENTS 4,005,768  2/1977  Bubnash et al. ................ 188/218 A

FOREIGN PATENT DOCUMENTS 2814252  10/1978  Fed. Rep. of Germany ...... 188/218 A Primary Examiner—Duane A. Reger
Attorney, Agent, or Firm—Browdy and Neimark

[57] ABSTRACT

An improved anti-rust cover for covering the outer side of a disc rotor of a vehicle disc brake. The anti-rust cover, which is capable of removably attached to the outer periphery of a dust cover for covering the inner side of the disc rotor at its outer periphery, is characterized in that the same is provided with a bridge portion formed by partly narrowing the width of the annular portion thereof and a detoured path portion formed by protruding a part of the bridge portion outwardly from base of the bridge portion to encircle a gate shaped open space in it.

10 Claims, 15 Drawing Figures

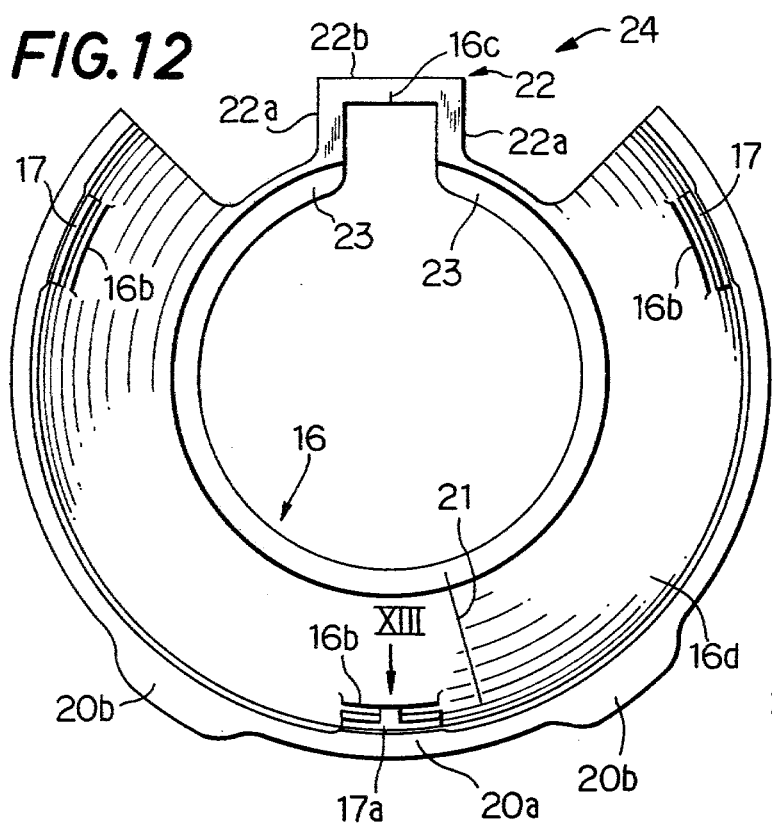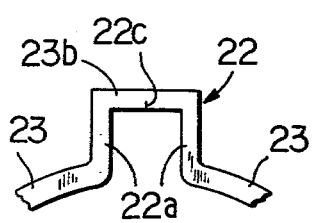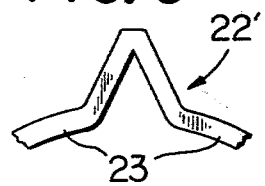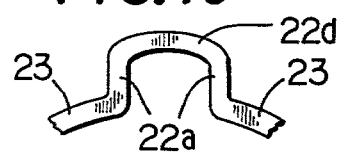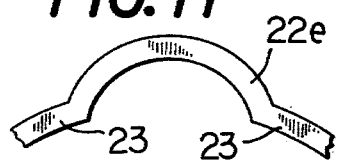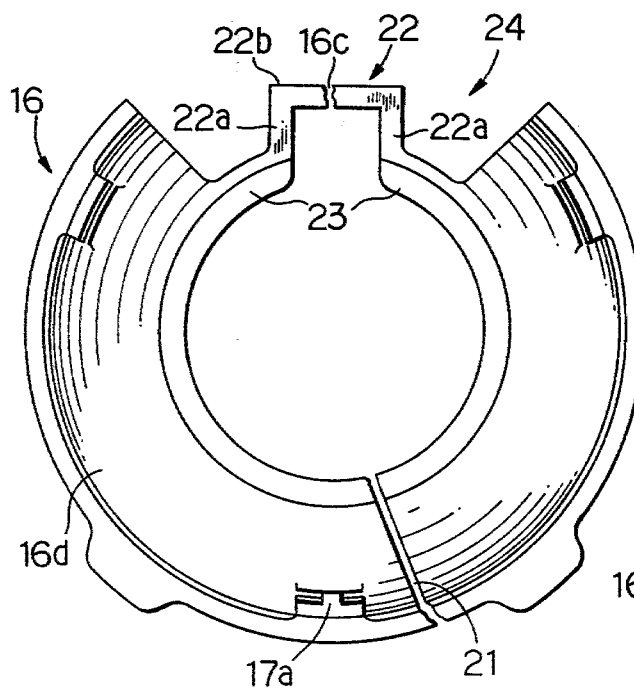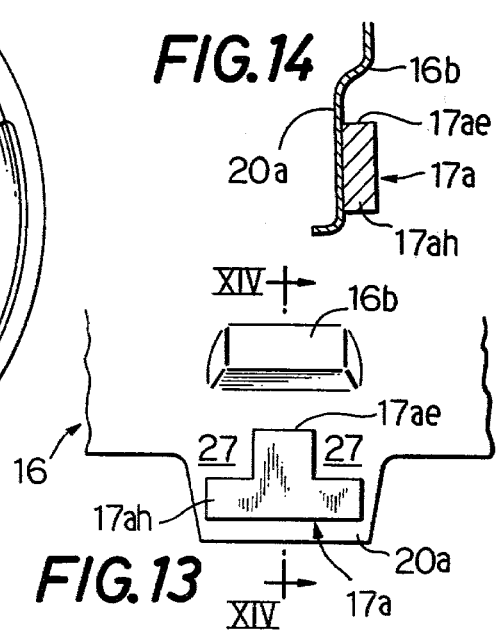

ANTI-RUST COVER FOR A DISC ROTOR OF A VEHICLE DISC BRAKE

BACKGROUND OF THE INVENTION

This invention relates to an anti-rust cover for a disc rotor in a disc brake used for a vehicle, more particularly, to one which is improved in its attachability in place by enhancing the resilience thereof by means of forming a detoured path portion, on a bridge portion which is made into an arcuate form in a portion of the anti-rust cover, in a manner of projecting outwardly from the arcuate bridge portion, and also improved in its handling or operational feature, when it is detached, by means of allowing the anti-rust cover to be easily broken away or torn off at the just mentioned detoured path portion.

A disc rotor in a vehicle disc brake, which is rotated in a body which a wheel, is usually made of cast iron, so it is highly likely to rust. Especially when a vehicle with such a disc rotor is exported in an ocean going steamer, it is often subjected to sea wind containing much salt while it is in waiting for the loading at the pier. Thus, the disc rotor is very likely to be rusted.

The rust produced on the surface of the disc rotor causes the brake pad urging the same to be worn out in a short period and the friction coefficient to decrease, accompanying a byproblem of deterioration of the braking performance. As a measure of anti-rusting, an application of anti-rusting treatment on the surface of the disc rotor is generally thought of. Coating of an anti-rusting material, for example, on its surface may result in a deficiency of the braking force through the decreasing of the friction coefficient of the rotor surface. It is, therefore, by no means desirable that the disc rotor in the unloaded vehicle in the importing land still has a remnant of anti-rusting material on it when the vehicle be handed over to the customer. If the anti-rusting material is removed earlier than the vehicle is delivered, the above-mentioned problem of rust-producing remains unsolved. For this reason, the coating of an anti-rusting material is usually regarded as impracticable. A usual way of preventing the rust, instead of the coating, has been to cover the disc rotor in order to physically protect it from the cause of rusting.

The general conventional practice has been therefore to attach an annular shaped anti-rust cover made of synthetic resin or cardboard to the dust cover, which is usually secured within a wheel on the inner side of the disc rotor (nearer to the center of the chassis), in order to cover the outer side of the disc rotor. This anti-rust cover, being attached on the outer periphery of the dust cover to cooperate therewith in enveloping the disc rotor for preventing the salty sea wind ingressing or flowing into the coverage, attains the aim of anti-rusting.

This known anti-rust cover is place temporarily, not being permanent use, i.e., the anti-rusting effect is provided while the vehicle is in the ocean going transportation route. Consequently, the anti-rust cover must be attached before the transportation and removed after the transportation after the main period during which the disc would be otherwise subjected to rusting is over, that is, prior to the delivery to the customer. For that purpose of removing, when it becomes unnecessary, an idea of making a slit in the bridge portion, where the annular portion of the anti-rust cover is partly narrowed, is practiced. It will make that portion of the anti-rust cover easy to be broken or torn only by pulling it when it must be removed. Formation of such a slit is inherently accompanied by some problems such as, possible variation of the size thereof which is liable to cause an undesirable breakage of the anti-rust cover when it is being attached to, unexpected difficulty of removing the anti-rust cover from the dust cover. This kind of anti-rust cover is, in addition, normally located in a very narrow space, within the wheel filled with some other deterrent parts, sandwiched between the disc rotor and the wheel disc, making it extremely difficult or troublesome to insert or reach one's hand into this narrow place or to handle it by lying on one's back beneath the vehicle chassis.

If and when the vehicle is placed in operations a severe condition, results if the anti-rust cover is not removed an accumulation of heat is liable to occur within the anti-rust cover as a result of the heat produced by the braking operation on the disc rotor, and an insufficient heat dissipation therein often overheats the disc rotor deteriorating the braking effect and sometimes causing the anti-rust cover itself to burn.

SUMMARY OF THE INVENTION

This invention was made considering that the magnitude and direction of force and other conditions affecting the bridge portion of the anti-rust cover (hereinafter at some points simply called cover), when the same is mounted on and removed from the dust cover, which is distinct from the anti-rust cover.

It is therefore the primary object of this invention to provide an anti-rust cover improved in its assemblability, or easiness in attaching to, and nevertheless easily removable from its place due to its easy breakability at a desired place.

This invention is characterized in that the anti-rust cover is, for attaining the aforementioned object, partly narrowed, at its annular portion, into a bridge portion, and a detoured path portion is formed in a manner of being projected outwardly from the bridge portion to define an open portion in it. Due to such a construction, rigidity of the anti-rust cover is decreased and elasticity is increased, thus, it is ready to be deformed, which facilitates the attaching operation of the same. However, the cover is on the other hand easy to break when desired at the detoured path portion of the bridge portion, if and when a force over a certain magnitude is applied for the purpose of intentionally removing the cover. This makes the anti-rust cover ideal for being taken off the disc brake when it needs to be, and moreover the removal operation does not take much time as the area of breakage has been fixed to a certain definite place.

BRIEF DESCRIPTION OF THE DRAWINGS

FIGS. 8–11 are respectively a partial elevation showing a variation of the bridge portion;

FIG. 12 is an elevational view, corresponding to FIG. 6, of another embodiment of this invention;

FIG. 13 is a projectional view of a part of FIG. 12 seen from the direction of XIII;

FIG. 14 is a cross-sectional view of FIG. 3 taking along the sectional line XIV; and FIG. 15 is an explanatory view for explaining how the second embodiment in FIG. 12 is broken or torn.

DETAILED DESCRIPTION OF THE PREFERRED EMBODIMENTS

Referring to the attached drawings preferred embodiments will be described hereunder.

Figure 1:
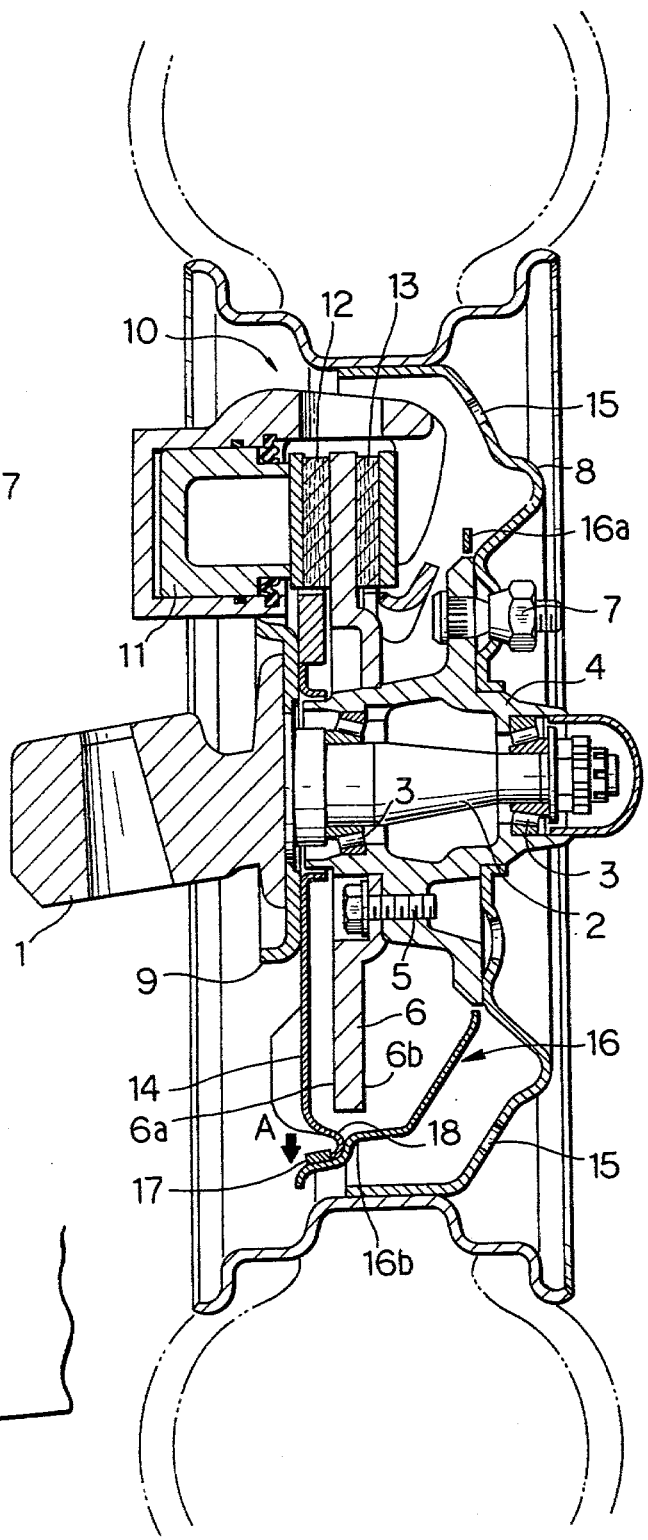
FIG. 1 is a cross-sectional view of a wheel for showing the environment of the disc brake with an anti-rust cover attached.

In FIG. 1, which shows a cross section of a driven vehicle wheel containing the disc brake in it, the wheel is provided with a knuckle 1, a shaft 2 secured to the knuckle 1, a hub 4 rotatably carried by the shaft 2 via bearings 3, a disc rotor 6 secured to the hub 4 by a bolt 5, a wheel disc 8 secured to the hub 4 by a bolt 7, a caliper supporter 9 secured to the knuckle 1, and a caliper which is secured to the caliper supporter 9 and generally designated by the numeral 10. Between the disc rotor 6 and the caliper 10 are disposed a pair of friction pads 12, 13; and in the caliper 10 is slidably disposed a piston 11 for urging the friction pads 12, 13 onto the disc rotor 6.

Figure 2:
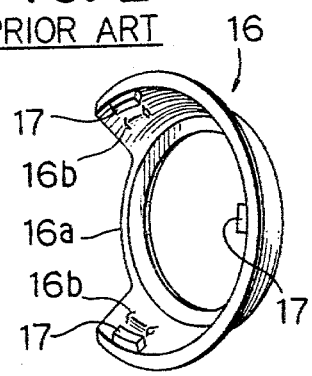
FIG. 2 is a perspective view of a conventional anti-rust cover to be attached to the disc brake.
Figure 4:
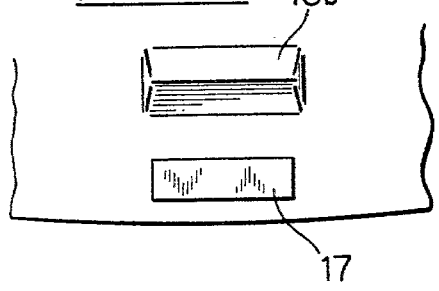
FIG. 4 is a projectional view of a part of FIG. 3 seen from the direction of the arrow IV.
Figure 3:
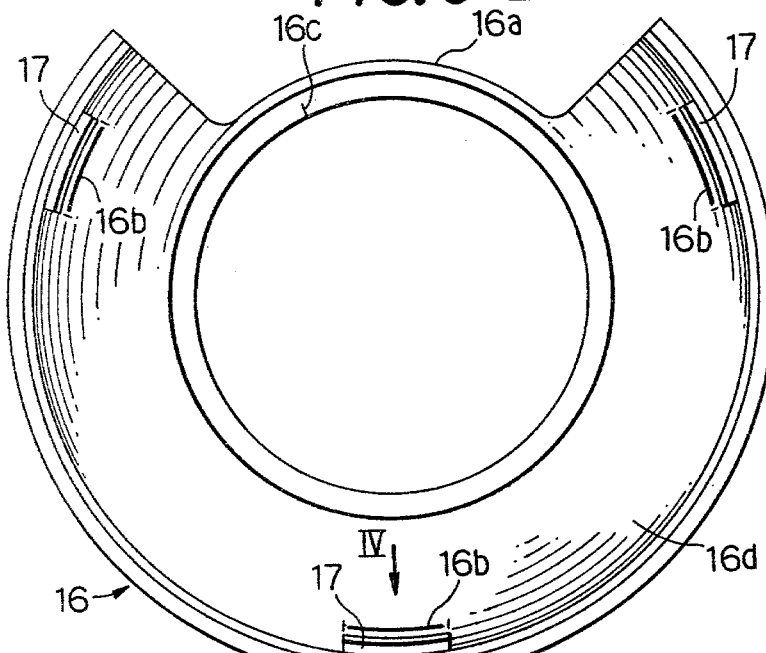
FIG. 3 is an elevational view of the same in FIG. 2.

On the caliper supporter 9 is attached a dust cover 14 in a confronted posture to the inner side 6a of the disc rotor 6 so as to cover the inner side thereof. The dust cover 14 functions to protect the disc rotor 6 from being stuck with foreign material such as dust. On the other hand, the wheel disc 8 is generally provided with an air introducing hole 15 for cooling the disc rotor 6 by the flowing-in air. This airintroducing hole 15 hitherto often allowed air containing some salt to come into the wheel disc 8, when the vehicle was placed in the neighborhood of a harbor for exportation, which produced rust there, especially on the outer surface 6b of the disc rotor 6. In order to prevent the ingress of the salty air thereinto, an anti-rust cover 16 was thought of to be put between the disc rotor 6 and the wheel disc 8. An example of this kind conventional anti-rust cover 16, shown in FIGS. 2–4, is provided with a bridge portion 16a, where a part of an annular hat portion 16d of a truncated cone type with a gentle slope is partly cut away to form the narrow width bridge portion 16a. This anti-rust cover 16 is further provided with, on the inner surface thereof, a plurality pairs (in this instance 3) of a projection 16b protruding inwards and a piece of fixing plate 17 (hereinafter called sometimes a plate member 17), which is attached nearer to the periphery of the hat portion 16d with a predetermined distance from the projection 16b, those plurality pairs being arranged with a predetermined circumferential phase difference from each other. Between the projection 16b and the plate member 17 can be snapped-in a peripheral trough-shaped portion 18 of the dust cover 14. This allows the cover 16 to be removably attached to the dust cover 14. The bridge portion 16a is further provided with a slit portion 16c.

Such an anti-rust cover 16 is to be attached only temporarily until the vehicle be delivered to the customer, which requires the same to be easy in attaching and detaching, low in manufacturing cost, and light in weight. Considering those necessary conditions the article is generally made of synthetic resins such as polyvinylchloride, polyethylene, polypropylene, etc., or cardboard (sometimes impregnated with wax when necessitated).

The slit portion 16c formed in the bridge portion 16a is aimed at easy breakage of the cover 16 in the neighborhood of the slit portion 16c when a force in the direction of arrow A is applied to the cover 16. It is, however, a very difficult job to form a slit of proper size; because a slit portion 16c made too large for being easy in detaching is likely to be too vulnerable even to a small force applied when attaching the same, and one made too small for being safe in attaching is likely to be too strong, requiring a strong force for detaching the same. Another problem is possible variation of size of the slit. It causes a possible consequential variation of the force amplitude required to detaching the cover 16. In many cases detaching operation of the cover 16 takes too much time, because the anticipated breakage portion will not often break even under a predetermined magnitude of force.

Figure 5:
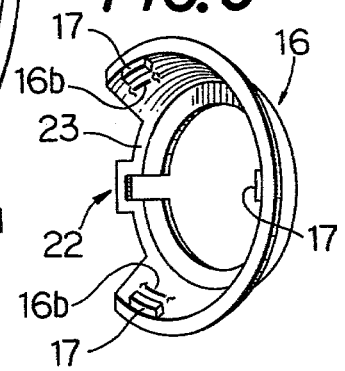
FIG. 5 is a perspective view, corresponding to FIG. 2, of an embodiment of this invention.
Figure 6:
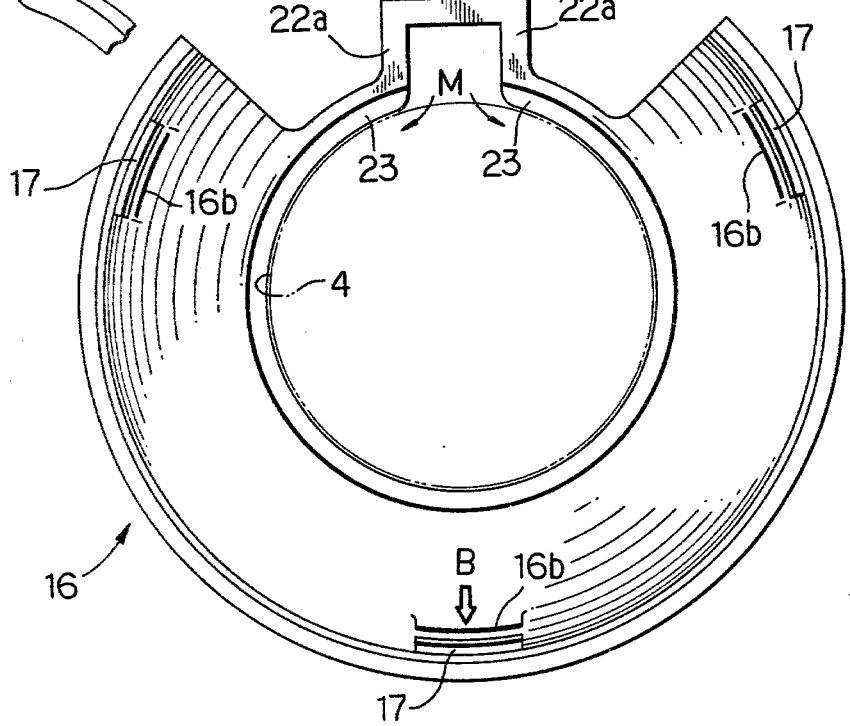
FIG. 6 is an elevational view, corresponding to FIG. 3, of the same embodiment.

This invention has succeeded in eliminating all of the disadvantages inherent to the prior art, by means of completely altering the shape of the bridge portion of the cover 16 from the conventional ones, as an embodiment of which is clearly indicated in FIGS. 5 and 6.

A first embodiment of the anti-rust cover 16 in accordance with this invention, shown in FIGS. 5 and 6, is of generally truncated cone shape, having a substantially annular hat portion similarly to the prior art shown in FIGS. 2–4, and being provided, on the inner surface, with three pairs of a projection 16b and a piece of fixing plate 17. The bridge portion 24, which is formed by breaking away a part of the annular portion into a narrow width arcuate portion with the aim of not interfering with the caliper 10 when the cover is attached, is composed of in this embodiment a bridge base portion 23 similar to the prior art and a detoured path portion 22 formed into a gate shape, framing a rectangular space in it, by protruding to the outer side (upper side in FIG. 6) relative to the bridge base portion 23 in a substantially radial direction of the cover 16. This gate shaped portion 22 is formed of a pair of parallelly protruded strip portions 22a from the bridge base portion 23 in the substantially radial direction of the cover 16 and a link portion 22b connecting the protruded strip portions 22a for completing the gate shape (rectangular with one side open). This anti-rust cover 16 of great feature can be attached to the dust cover 14 just in a similar manner as in FIG. 1.

Owing to formation of the detoured path portion 22 (winding or bending to encircle a rectangular space in it) in the bridge portion 24, the cover 16 has been largely improved in its assemblability, that is to say, it is now not subjected to easy breakage when being attached. Even when the inner diameter of the cover 16 is made unexpectedly smaller than the outer diameter of the hub 4 (see FIG. 1) because of some dimensional errors, or when a collision of the cover 16 with any of the neighboring parts occurs by chance, a possible consequential act of undesirable force in the direction of breaking open the bridge portion 24 of the cover 16 (lateral direction in FIG. 6) will be absorbed by the elastic deformation of the detoured path portion 22 of a gate shape, leaving little fear of the detoured path portion being broken open during the attaching operation of the cover 16. This is because of low rigidity of the gate shaped detoured path portion 22 against a force which enlarges the distance between the protruded strip portions 22a at their root portion, where they are connected to the bridge base portion 23; besides, this force is normally of little magnitude.

Figure 7:
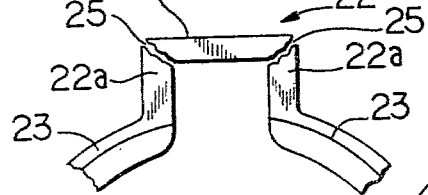
FIG. 7 is an explanatory view for explaining how the embodiment in FIG. 6 is broken or torn.

On the contrary, the detoured path portion 22 can be easily broken open, when the cover 16 needs to be removed, only by means of applying a certain force, in the direction marked with B in FIG. 6, with a finger(s) held on the plate member 17 on the inner surface of the cover 16. When a force in the B direction is applied, while the cover 16 is being pulled out, the inner periphery of the cover 16 is abutted on the outer periphery of the hub 4, shown in a dot-dot-dash line in FIG. 6, and a bending moment M in the direction of enlarging the distance between the root portion of the both protruding strip portions 22a is exerted to the cover 16 as the same is pulled out more and more. This moment M, together with the acting tensile force which is presumed quite natural to occur there, will cause a breakage at least at one corner portion 25 shown in FIG. 7 (connecting portion of the protruded strip portion 22a and the link portion 22b) of the detoured path portion 22, where the stress concentration is likely to occur.

The shape and dimension of the detoured path portion 22 are naturally determined in advance, so the strength thereof is almost constant, not significantly varied. The detoured path portion 22 is broken open without fail by being applied a force corresponding to the above-mentioned predetermined strength, which has completely eliminated the conventional problem that the size of the slit largely affects the easiness of removing the cover 16. Although the detoured path portion 22, in this embodiment, of gate shape is made breakable at the corner portion 25, it is also permissible to form a slit, when necessary, in the vicinity of the center of the link portion 22b, as shown in FIG. 8, which with high probability leads to a breakage of the detoured path portion 22 into an almost symmetrical form.

The gate shaped detoured path portion 22 of substantially rectangular, built on the bridge portion 24 by bending the path almost at right angle, may also be so formed to exhibit an inverted V-shape detoured path portion 22' as shown in FIG. 9. Some other modifications such as one in FIG. 10, wherein a pair of parallelly protruded strip portion 22a projected outwards from the bridge base portion 23 is connected by an arcuate link portion 22d, and another in FIG. 11, wherein an arcuate protrusion 22e is projected outwards like a rainbow from the arcuate bridge base portion 23, are similarly passable for the purpose as the detoured path portion 22.

In this invention the bridge portion 24 including a detoured path portion 22 of gate shape is preferably employed, however, the shape of the detoured path portion is not limited to the gate shape. Any of the bridge portions 24 composed of an arcuate base portion, which extends in the circumferential direction while keeping a substantially identical radial distance from the center of the anti-rust cover 16, and a detoured path portion projected outwards from the base portion, regardless of it shape, is acceptable. As to the projecting direction of the detoured path portion, it is not necessarily limited to the substantially radial direction of the anti-rust cover 16 as in the first embodiment. So long as the detoured path portion is outwardly projected in its plan view from the bridge base portion 23 (see FIG. 6), the direction or angular direction of the projection may be freely chosen. It is also possible that the projection of the detoured path portion 22 is extending, for example, in the direction of the surface of the annular hat portion of the anti-rust cover 16, i.e., the same direction to the conical surface.

The anti-rust cover 16 of the present invention may be, in addition to the above-mentioned shape of the bridge portion, have added some other features and characteristics in order to improve the operability or easiness of handling when it is removed. One example preferable is shown in FIGS. 12–15. The anti-rust cover 16 shown in FIG. 12 may be said to be close to an ideal one provided with many desirable features and characteristics.

The anti-rust cover 16 in FIG. 12 is provided with, not only the bridge portion 24 having the gate shaped detoured path portion 22 just like one in FIG. 6, but also three tongue portions 20a, 20b protruding from the peripheral end of the cover 16. These three tongue portions 20a, 20b are for being held by a hand when the cover 16 is removed, which facilitates largely holding, pulling, and taking out the cover 16 from the wheel disc. At the immediate inside of the tongue portion 20a, where the largest tensile force is applied when the cover 16 is removed, as can be seen in FIGS. 13 and 14, because of its 180° location from the detoured path portion 22, the cover 16 must be reinforced by arranging there at least a part of the plate member 17a, in order to prevent the tongue portion 20a from being torn or broken off alone when the cover 16 is pulled out.

And the plate member 17a of inverted T-shape is attached such that the outer periphery of the dust cover can be snugly engaged in a clearance between the projection 16b and the lower end of the inverted T's leg portion 17ae. A space 27 possibly formed between the head portion of the T letter 17ah and the outer periphery of the dust cover can afford a hand-holding recess, which ensures the detaching or removal operation of the cover 16 when its needs to be taken away. Disposition of at least one tongue portion of this kind will be enough for attaining the purpose and the inverted T-shape plate may be altered to L-letter shape, U-letter shape, or sideways U-letter shape, so long as the space 27 for holding a finger be made therein.

The anti-rust cover 16 of FIG. 12 is further provided with a first slit 16c in the link portion 22b which constitutes the detoured path portion 22 of the bridge portion 24, and a second slit 21 in the hat portion 16d located polarly opposite to the bridge portion 24 and between the tongue portions 20a and 20b, extending in the radial direction of the anti-rust cover 16. Those two slits 16c and 21 formed in the cover 16 help the same to be splitted into two pieces as shown in FIG. 16 when it is removed, which makes the taking out operation of the cover much easier than before. Such slit(s) may either be a through slit or a recessed groove; and slits more than two may be allowed for making the cover 16 split into three or more pieces for an easier taking out operation.

The cover 16 in FIG. 12 is provided with several advantageous devices, in addition to the detoured path portion 22, such as the tongue portions 20a, 20b, the plate member 17a, two types of slits 16a, 21 which largely enhance the easiness of detaching operation when the cover 16 needs to be removed. It goes without saying that any kind of combination among those meritorious devices will be much better than the simple detoured path portion case.

The above-mentioned embodiments are only for exemplification, which do not mean at all that the invention should be interpreted to confine its sphere to those examples. Many modifications and variations are of course possible for those skilled in the art within the spirit of the present invention.

As described above in greater detail, the detoured path portion formed on the bridge portion of the anti-rust cover can be a preventive, when the anti-rust cover is attached to, of breakage of the anti-rust cover, which may be caused by dimensional errors or other reasons, because of its elastic deformation, and also can be a guarantee of easy breaking open of the anti-rust cover, to a great advantage, when it is detached, under a bending moment or tensile force. It can be said a significant invention that has greatly improved the easiness and sureness of attaching and detaching operation of the anti-rust cover.

What is claimed is:

1. In an anti-rusting arrangement for a disc rotor of a vehicle disc brake including a disc rotor integrally rotatable with a wheel, a dust cover covering the inner side of said disc rotor, and an anti-rust cover covering the outer side of said disc rotor, which anti-rust cover is retained by being removably attached to the outer periphery of said dust cover, an improvement of said anti-rust cover characterized in that the same comprises a hat portion of generally truncated cone shape and a bridge portion of arcuate configuration formed by partly narrowing the width of said hat portion, said bridge portion being provided with a detoured path portion protruding outwardly therefrom for encircling an open space in it.

2. The improvement of the invention claimed in claim 1, wherein said bridge portion of said anti-rust cover comprises an arcuate bridge base portion and a detoured path portion protruding outwardly from said bridge base portion substantially in a radial direction of said anti-rust cover, and said detoured path portion further comprises a pair of strip portions parallelly protruded from said bridge base portion substantially in the radial direction of said anti-rust cover and a link portion connecting said strip portions in a tangential direction for forming a substantially rectangular space encircled therein.

3. The improvement of the invention claimed in claim 1, wherein said anti-rust cover is provided with a plurality of engaging members fixed on the inner surface, in the neighborhood of the outer periphery, thereof with a predetermined phase difference from each other, and a plurality of projections formed on said anti-rust cover respectively in confrontation with said engaging member and on the nearer side to the center of said anti-rust cover, whereby said anti-rust cover can be removably attached to said dust cover by means of allowing the outer periphery of said dust cover to be fitted in between said engaging member and said projection.

4. The improvement of the invention claimed in claim 3, wherein at least one of said engaging members has such a configuration that includes an engaging portion which abuts, for engaging with, the outer periphery of said dust cover, and an open space, formed between said engaging member itself and the outer periphery of said dust cover, allowing at least a part of a human finger to be held therein.

5. The improvement of the invention claimed in claim 4, wherein said engaging member is of inverted T-shape, and the end of whose leg portion constitutes an engaging portion which abuts, for engaging with, the outer periphery of said dust cover, and further the head portion of said inverted T-shape engaging member perpendicularly positioned to said leg portion affords an open space for a human finger to be held therein.

6. The improvement of the invention claimed in claim 4, wherein said engaging member is located on the annular hat portion of said anti-rust cover polarly opposite side of said bridge portion.

7. The improvement of the invention claimed in claim 1, wherein said anti-rust cover is provided with at least one tongue portion integrally formed for outwardly projecting from the outer periphery thereof.

8. The improvement of the invention claimed in claim 1, wherein said anti-rust cover is provided with a slit formed in said bridge portion.

9. The improvement of the invention claimed in claim 8, wherein said anti-rust cover is provided with at least one second slit formed, in the radial direction of said anti-rust cover, on the annular hat portion thereof.

10. The improvement of the invention claimed in claim 9, wherein said anti-rust cover is provided with, on both sides of said second slit on the annular hat portion, a respective tongue portion integrally formed for outwardly projecting from the outer periphery thereof.

* * * * *